Nov. 16, 1948.  R. E. MARBURY  2,454,192
CRITICALLY DAMPED CAPACITOR
Filed Jan. 14, 1944

WITNESSES:

INVENTOR
Ralph E. Marbury.
BY
ATTORNEY

Patented Nov. 16, 1948

2,454,192

UNITED STATES PATENT OFFICE 2,454,192

CRITICALLY DAMPED CAPACITOR

Ralph E. Marbury, Wilkinsburg, Pa., assignor to Westinghouse Electric Corporation, East Pittsburgh, Pa., a corporation of Pennsylvania Application January 14, 1944, Serial No. 518,210

2 Claims. (Cl. 175—41)

The present invention relates to electric capacitors and, more particularly, to a capacitor which has sufficiently high internal resistance to effect critical damping so as to prevent oscillatory discharges.

The capacitor of the present invention is especially intended for use with welding equipment of the so-called energy-storage or capacitor type, although its usefulness is not necessarily restricted to this specific application. In the energy-storage type of welding, a capacitor, or bank of capacitors, is charged by direct current and then discharged through the primary winding of a welding transformer to produce a pulse of current in the low-voltage secondary winding which is connected to the welding electrodes, so as to supply a predetermined amount of energy to the weld. In the normal operation of this type of equipment, the capacitors are charged relatively slowly and the discharge is not oscillatory, so that there are no reversals of the voltage stress on the capacitor insulation. For this reason, the duty on the capacitors is relatively easy, and capacitors for this type of equipment are usually designed to have about 20% higher voltage stress on the insulation, and to store considerably more energy, than capacitors of equivalent size and rating intended for other applications, such as power-factor correction on alternating-current circuits, or other direct-current electronic applications.

In the use of energy-storage welding equipment, it is usually necessary from time to time to adjust the equipment for different welding currents for different sizes and types of material to be welded, and this adjustment is usually made by connecting additional capacitors to the bank, or by disconnecting capacitors from the bank. When an uncharged capacitor is connected to a fully or partly charged capacitor bank, the charged capacitors discharge into the uncharged capacitor, and this discharge is an oscillatory discharge in the usual circuits having normal values of inductance in the leads between the capacitors. Since these capacitors operate under higher normal voltage stress than other types of capacitors, these oscillatory discharges involve increased danger of insulation failure in the capacitor and are therefore very undesirable. The usual practice has been to provide external resistors mounted on the capacitors to introduce sufficient resistance in the circuit to prevent oscillatory discharges when an uncharged capacitor is connected to the capacitor bank. These external resistors, however, are undesirable since they take up considerable space and involve additional cost, as well as complicating the bus-bar arrangement and the connections between the capacitors.

The principal object of the present invention is to provide a capacitor which has sufficiently high internal resistance to make it critically damped for any usual or reasonable value of inductance in the external circuit, so as to prevent oscillatory discharges without requiring the use of external resistors.

A further object of the invention is to provide a capacitor having a relatively high internal resistance built into the capacitor in such a manner that the heat generated in the resistance is uniformly distributed throughout the capacitor so that it is dissipated without hot spots or excessive temperature rise, and which does not require any more material than the conventional capacitor construction.

Another object of the invention is to provide a capacitor having sufficiently high internal resistance to limit the amount of energy that can be discharged from a capacitor, or capacitor bank, into a faulted capacitor, so as to prevent the danger of bursting the case of the faulted capacitor with resultant damage to adjacent capacitors or other apparatus.

A more specific object of the invention is to provide a capacitor in which the individual capacitor sections or windings, of which the complete unit is made up, are arranged and connected in such a manner that the resistance of the metal foils is used to provide a sufficiently high internal resistance to limit, or substantially prevent, oscillatory discharges.

The invention will be more fully understood from the following detailed description, taken in connection with the accompanying drawing, in which.

Figure 1:
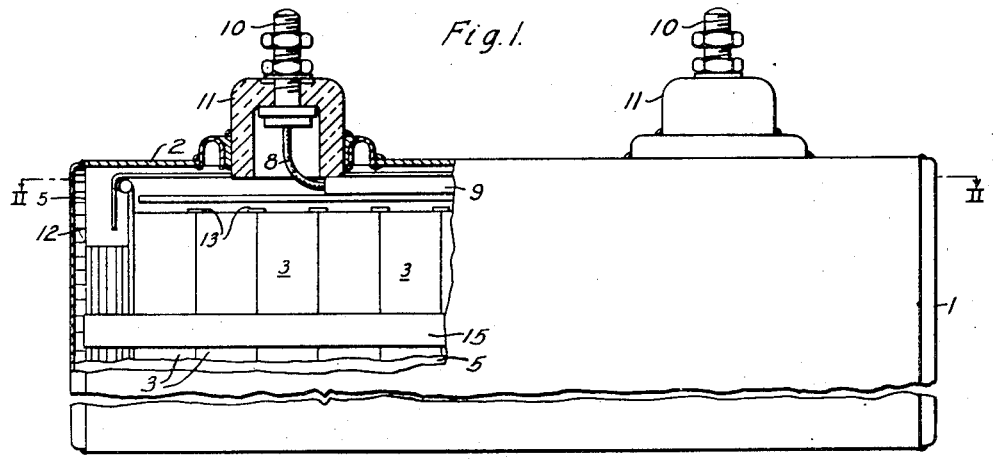
Figure 1 is a side elevation of a capacitor embodying the invention, partly broken away to show the internal arrangement.
Figure 2:
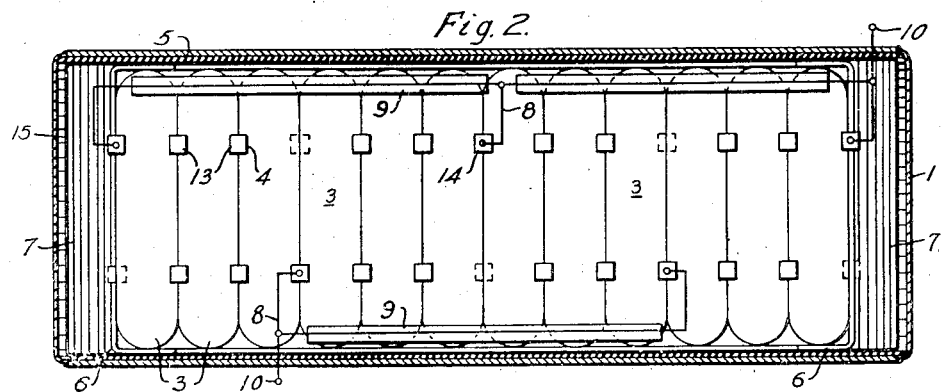
Fig. 2 is a sectional plan view approximately on the line II—II of Fig. 1, with the internal leads shown diagrammatically.

The capacitor shown in Figs. 1 and 2 is contained in a metal tank or case 1, which may be of the usual welded construction to make it leakproof, and which has a top or cover 2. The capacitor is made up of a plurality of individual capacitor sections or windings 3 disposed in a stack in the case 1. The sections 3 differ somewhat in construction from the conventional capacitor sections, although they are preferably made in substantially the same way. Each of the sections 3 consists of a pair of metal foils of suitable width and length to give the section the desired capacitance. The foils are separated in the usual manner by dielectric material, which preferably may consist of several thicknesses of very thin, high quality paper, and the interleaved foils and dielectric material are wound on a mandrel in the usual manner. In the conventional construction of capacitor sections, a terminal tab is inserted in contact with each foil during the winding operation, usually at points near the middle of the foils. In accordance with the present invention, however, in winding the capacitor sections 3, a terminal tab 4 is inserted in contact with each foil near one end of the foils at the beginning of the winding operation, and another terminal tab 4 is inserted in contact with each foil near the other ends of the foils at the end of the winding operation, so that the completed section has four terminals, one at each end of each of the two foils. After the winding is completed, the wound section may be flattened to form a flat, multi-layer capacitor section which differs from the usual type only in the number and location of terminals.

The capacitor sections 3 are disposed in a stack in the case 1, and preferably are positioned in a channel member 5 of insulating material, such as pressboard, to support them and insulate them from the case. Additional insulating members 6 may be provided at each end of the stack of sections and any remaining space at each end of the channel may be filled by insulating spacers 7. The assembly of capacitor sections and insulating spacers is held together under pressure by any suitable means, such as bands of cotton tape 15 wrapped around the assembly near the top and bottom. The completed assembly is placed in the channel 5 inside the case 1, and the capacitor sections 3 are connected to the external circuit by means of internal leads 8, which may be disposed in fiber tubes 9, and which are connected to terminal studs 10 extending through porcelain bushings 11 sealed in the top 2 of the case 1. After the assembly is completed, the sections 3 are impregnated, and the case 1 is filled, with a suitable liquid dielectric material 12 in the usual manner, after which the case is sealed.

Figure 3:
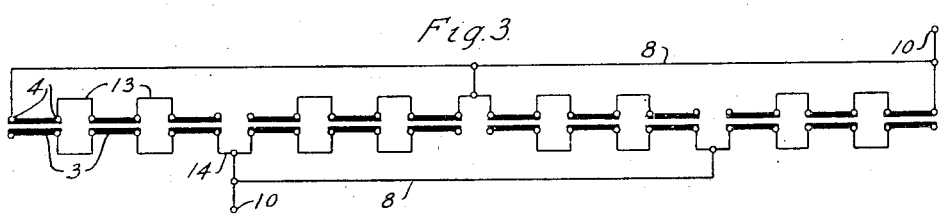
Fig. 3 is a schematic wiring diagram showing the arrangement and connections of the capacitor sections.

The internal electrical connections between the capacitor sections 3 are shown in Figs. 2 and 3. As shown in these figures, the particular capacitor illustrated consists of twelve sections, which are connected in four paralleled groups of three sections each. The sections of each group are connected together by means of strap connectors 13 joining the terminals 4 of adjacent capacitor sections. Each terminal 4 of a capacitor section 3 is connected to a terminal 4 of the foil of the same polarity of an adjacent section of the same group, so that all the foils of the same polarity in each group of sections are connected in series. The four groups of capacitor sections are connected in parallel by means of similar strap connectors 14 which are connected to the internal leads 8.

Because of the manner in which the sections 3 are connected together, and the parallel connection of the group of sections, the resultant capacitance of the entire capacitor is the same as though all twelve sections were individually connected in parallel in the usual manner. Because of the series connection of the foils in each group of sections, however, the internal resistance is very high as compared to that of the conventional capacitor construction for the reason that the current flowing to each group of capacitor sections flows through all the foils of the same polarity in series so that the resultant effective resistance of each group of sections is the same as though it were replaced by a single larger section having the same total length of foil, which would be an impractical construction for any actual capacitor. In this way, a capacitor is provided which has relatively very high internal resistance, which can readily be made high enough to make the capacitor critically damped for any usual or reasonable value of inductance in the external circuit, and thus the occurrence of oscillatory discharges is prevented in a convenient and inexpensive manner.

Figure 4:
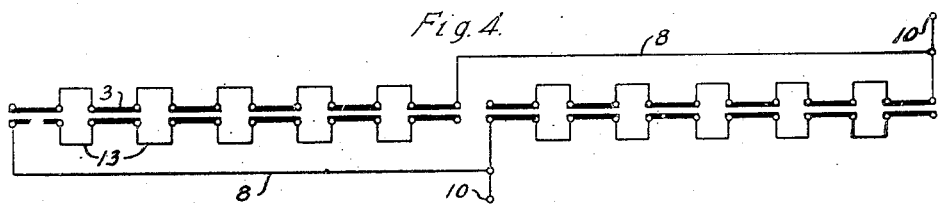
Fig. 4 is a diagram similar to Fig. 3, showing an alternative embodiment of the invention.

It will be apparent that the internal connections between the capacitor sections can readily be varied to give various values of resistance to meet any necessary conditions. Thus, Fig. 4 shows an alternative arrangement having an internal resistance approximately four times as great as that of the arrangement of Fig. 3 with capacitor sections 3 of identical design. In this arrangement, the sections are connected in two parallel groups with the foils of the same polarity of all sections in each group in series. It will be seen that the capacitance of this capacitor is the same as that of Fig. 3, but that the internal resistance is approximately four times that of Fig. 3 since there are only two current paths in the capacitor of Fig. 4, each having twice the resistance of each of the four current paths of Fig. 3. It will be obvious that various other internal connections can be used to provide different values of resistance without changing the capacitance or voltage rating of the capacitor.

It should now be apparent that a capacitor has been provided for use in energy-storage welding equipment, or similar applications, where it is necessary to provide sufficient resistance to prevent oscillatory discharges of the capacitor. This result is obtained by arranging and connecting the individual capacitor sections or windings in such a manner as to provide a high enough internal resistance in the capacitor to make it critically damped, and thus to prevent the undesired oscillatory discharges without the use of external resistors. Since this internal resistance is obtained by making use of the resistance of the foil itself, it is obtained without requiring any additional material, and without increasing the cost of the capacitor over that of a conventional unit. Since the internal resistance is evenly distributed throughout the capacitor, the heat generated in it is also uniformly distributed, and is dissipated without excessive temperature rise and without causing any hot spots to develop.

Another important advantage of the present invention is the current limiting effect of the high internal resistance under fault conditions. In energy-storage welders and similar equipment, the capacitors are arranged in a bank and are mounted on a rack relatively close to each other. In case of an insulation failure in one of the capacitors, the other capacitors of the bank will discharge a very large amount of energy into the fault, which may be enough to cause the case of the faulted capacitor to burst, and because of the close positioning of the capacitors, this may result in damage to adjacent capacitors. The high internal resistance of the capacitors of the present invention, however, limits the fault current that can flow to a faulted capacitor, and thus limits the amount of energy that can flow into the fault, so that the possibility of damage to adjacent capacitors is greatly reduced.

It is to be understood that although a specific embodiment of the invention has been shown and described for the purpose of illustration, it is not limited to the specific structural details and arrangement shown, but is capable of various other arrangements and embodiments, and in its broadest aspects the invention includes all equivalent embodiments and modifications which come within the scope of the appended claims.

I claim as my invention:

1. A capacitor comprising a case, two terminal devices mounted on the case for connection to an external circuit, a plurality of physically separate capacitor sections disposed in the case, each of said capacitor sections consisting of a pair of conducting foils separated by dielectric material, and each of said sections having terminal means adjacent each end of each foil, means for connecting said capacitor sections in groups, said connecting means including means for connecting together in series one foil of each of the sections in each group, means for connecting together in series the other foils of the sections in each group, means for connecting one end of one series-connected set of foils of each group to one of said terminal devices, and means for connecting one end of the other series-connected sets of foils to the other of said terminal devices.

2. A multi-section capacitor comprising a plurality of individual capacitor sections, each of said sections consisting of two continuous conducting foils separated by dielectric material and spirally disposed in a multi-turn capacitor section, means for electrically connecting said capacitor sections in groups, said connecting means including means for connecting together in series one foil of each of the capacitor sections in each group, means for connecting together in series the other foils of each of the capacitor sections in each group, first terminal means connected to one end of one series-connected set of foils of each group of sections, and second terminal means connected to one end of the other series-connected set of foils of each group of sections, whereby current flows through all the foils of each set in series.

RALPH E. MARBURY.

REFERENCES CITED

The following references are of record in the file of this patent:

UNITED STATES PATENTS

| Number | Name | Date |
| --- | --- | --- |
| 1,441,087 | Hill | Jan. 2, 1923 |
| 1,611,990 | Bonine | Dec. 28, 1926 |
| 2,162,475 | Brooks | June 13, 1939 |
| 2,254,214 | Gage | Sept. 2, 1941 |
| 2,281,571 | Gage | May 5, 1942 |
| 2,317,642 | Robinson | Apr. 27, 1943 |
| 2,319,594 | Gage | May 18, 1943 |